United States Patent [19]
Evans et al.

[11] 3,943,511
[45] Mar. 9, 1976

[54] SPIKE ENABLE CIRCUIT

[75] Inventors: Norol T. Evans, San Pedro; Richard F. Hyneman, Fullerton, both of Calif.

[73] Assignee: Hughes Aircraft Company, Culver City, Calif.

[22] Filed: May 31, 1974

[21] Appl. No.: 475,710

[52] U.S. Cl. .......................... 343/7 A; 343/100 LE
[51] Int. Cl.² .......................................... G01S 9/02
[58] Field of Search ................... 343/100 LE, 7 A

[56] References Cited
UNITED STATES PATENTS

| | | | |
|---|---|---|---|
| 3,032,757 | 5/1962 | Majerus et al. | 343/100 LE |
| 3,704,464 | 11/1972 | Drane, Jr. et al. | 343/100 LE |
| 3,860,924 | 1/1975 | Evans | 343/7 A |

*Primary Examiner*—Malcolm F. Hubler
*Attorney, Agent, or Firm*—Paul H. Ware; W. H. MacAllister

[57] ABSTRACT

The elimination of interfering radiation from received radar signals is generally accomplished by side-lobe suppression systems. Large clutter signals, however, can cause a side-lobe suppression system to become almost inoperable. In a high clutter environment the operation of a conventional side-lobe suppression system may also result in a high incidence of false alarms. In the present invention, pulse interference that arrives by way of the main antenna side-lobes that is smaller on the side-lobe suppression channel than the clutter signal appearing on the main radar channel is blanked prior to the implementation of a moving target indication (MTI) channel. A sharply rising interference pulse such as a spike occurring in the auxiliary channel may be detected by a fast time constant (FTC) circuit to provide a sidelobe blanking signal.

16 Claims, 5 Drawing Figures

SPIKE ENABLE CIRCUIT

The invention described herein was made in the course of or under a contract or subcontract thereunder with the Department of the Navy.

BACKGROUND OF THE INVENTION

1. Field of the Invention

This invention relates to radar systems and more particularly to the blanking of pulse interference.

2. Description of the Prior Art

Side-lobe blanking circuits are used to blank out interfering or jamming pulses and are usually implemented at the video output of the radar receiver. In the conventional radaor side-lobe blanking system, two antennas are used, one having a highly directional beam and the usual side-lobes is employed as the main antenna, the other auxiliary antenna is often an omnidirectional antenna whose gain is substantially equal to the gain of the principal side-lobes of the main antenna. The gain of the auxiliary antenna may be made slightly larger, say about 6 dB, than the gain of the principal side-lobes of the main antenna. When a signal as received in the omnidirectional or auxiliary antenna is larger than the signal as received in the principal side-lobes of the main antenna, a blanking signal is developed and applied to the receiver processing circuits. When the signal as received in the directional antenna is considerably larger than the signal as received in the omnidirectional antenna, indicating the presence of a target in the main beam of the directional antenna, no blanking signal is developed thus allowing presentation of the display of a signal received in the main beam of the directional antenna. Signals received in the side-lobes but not in the main beam of a directional antenna are thus eliminated while signals received in the main beam are displayed.

In conventional side-lobe blanking receivers utilizing an auxiliary antenna arrangement, the side-lobe signals are processed in the side-lobe receiver in an identical manner to the precessing of the signals in the main radar receiver. The detected outputs of the two receivers are then compared and if the amplitude of the video signal from the side-lobe receiver exceeds the amplitude of the radar receiver video signal, a blanking gate having the width of the side-lobe video is generated. This blanking gate is used for blanking the corresponding false target or any target appearing in the radar receiver at that time. If the amplitude of the radar receiver video exceeds that of the side-lobe receiver video, a blanking gate is not generated and the target is assumed to be real. However, in a radar system having a moving target indication mode, the side-lobe blanking can cause a substantial increase in false target reports at the output of the moving target indicator. For instance, the clutter on the main channel might be plus 40 db signal-to-noise ratio, the interference signal on the auxiliary channel plus 30 db signal-to-noise ratio, and the interfering pulse on the main channel plus 20 db signal-to-noise ratio. A conventional side-lobe suppression blanking system would not blank this pulse, therefore if the clutter on the main channel were later reduced by an MTI process, the plus 20 db interference pulse on the main channel would cause a false alarm.

A system that would substantially eliminate the type of pulse interference as described herein while at the same time maintaining a relatively low false target rate would be of considerable importance to the art.

SUMMARY OF THE INVENTION

The proposed spike enable circuit allows the radar system so equipped to operate in an environment containing large clutter and interfering signal pulses without a large false alarm rate due to the effects of such large clutter or signal returns. In the radar system of the invention, a spike enable circuit is provided in combination with a conventional side-lobe blanking system and a moving target indicator system that operates to eliminate the substantial increase in false target reports that occurs at the output of conventional side-lobe blanking and moving target indicator systems. In order to provide a relatively low false target rate, the spike enable circuit includes a fast time constant circuit responsive to the auxiliary channel signal and which may be in combination with a threshold circuit. The spike enable circuit operates in parallel with the conventional comparison network of a side-lobe blanking system. In accordance with the principles of the invention the auxiliary antenna may be selected with an odd pattern symmetry such as a difference pattern to provide a substantial reduction of the clutter return on the auxiliary channel.

It is therefore an object of this invention to provide a radar receiver system that allows blanking of interfering signals while reliably processing target return signals in a high clutter environment.

It is a further object of this invention to provide an improved radar system utilizing side-lobe blanking in combination with a moving target indicator that will operate at a relatively low false target rate.

It is a still further object of this invention to provide a moving target indicator system in combination with a side-lobe blanking system that, with a minimum of additional hardware, substantially eliminates false target reports conventionally caused by the side-lobe blanking action in high clutter environments.

Another further object of this invention is to blank pulse interference that arrives by way of the main antenna side-lobes that is smaller on the side-lobe suppression channel than the clutter signal appearing on the main radar channel.

BRIEF DESCRIPTION OF THE DRAWINGS

These and other objects, features and advantages of the invention itself will become apparent to those skilled in the art in the light of the following detailed description taken in consideration with accompanying drawings wherein like reference numerals indicate like corresponding parts throughout the several parts wherein.

Figure 1:
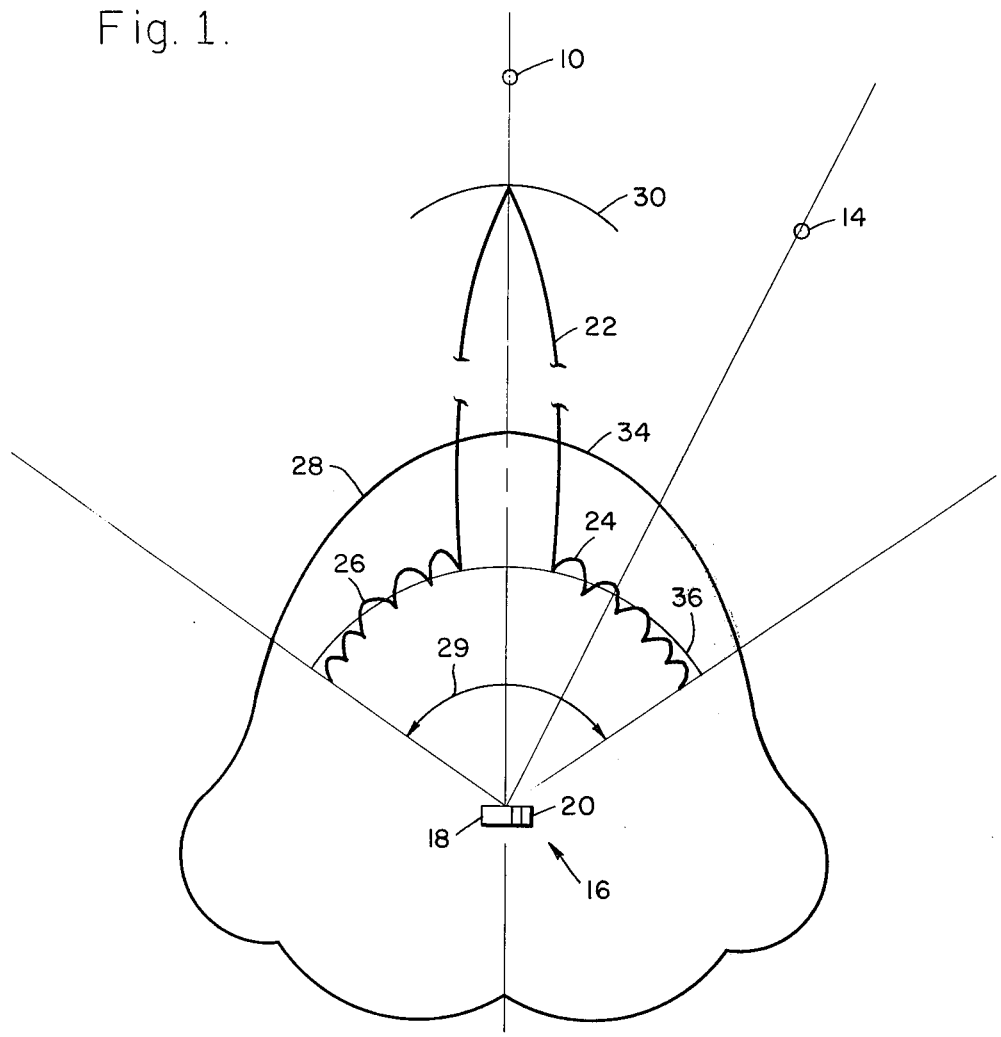
FIG. 1 is a schematic plan view showing the gain characteristics of a main lobe antenna and an auxiliary antenna in a conventional side-lobe suppression system.

Referring first to FIG. 1, general operation of a conventional side-lobe blanking system will be first explained relatively to a target 10 and an interfering source 14. An antenna system 16 may include a main lobe or radar antenna 18 and a side-lobe or auxiliary antenna 20, normally positioned adjacent to each other or in close proximity. The antennas 18 and 20 may be different aperture elements in the same array or may be parabolic dish type antennas placed substantially close to each other. The radar antenna 16 has a main lobe pattern 22 and a plurality of side-lobe patterns such as 24 and 26. The auxiliary antenna 20 which is a side-lobe antenna may be a low gain antenna and have an antenna pattern such as 28 which may be of a substantially constant amplitude over an azimuth receiver range of an angle 29. The gain of the main lobe antenna is shown by a line 30 and the gain of the side-lobe antenna 20 is shown by line 34.

The side-lobes of the main radar antenna 18 have a general amplitude indicated by a line 36. A gain between that of the auxiliary antenna 34 and the side-lobe antenna gain of the line 36 may be a selected decibel value. Energy from the interfering source 14 has a gain in the auxiliary side-lobe antenna indicated by the line 34 and a gain in the main lobe antenna indicated by the line 36. Thus, energy received from the source 14 is interpreted as side-lobe energy, to be blanked out in response to a comparison of the auxiliary side-lobe signal amplitude to the main radar signal amplitude in which the auxiliary side-lobe signal amplitude is larger. The interfering source 14 may be any operating radar system providing interference energy, a side-lobe repeater, as is well-known in the art, or any pulsed interference generator responsive to the received pulsed repetition frequency, for example, or for that matter, any source of clutter.

The radar echo return from the target 10, on the other hand, will exhibit a much greater amplitude in the main radar channel since it is being "seen" by the main lobe 22. Subsequent comparison to the signal appearing on the auxiliary channel will show this considerably greater amplitude and will therefore indicate a true target, that is, one not to be blanked out. Such a target as that shown at 10 will then be processed and displayed by the conventional radar receiver system.

Figure 2:
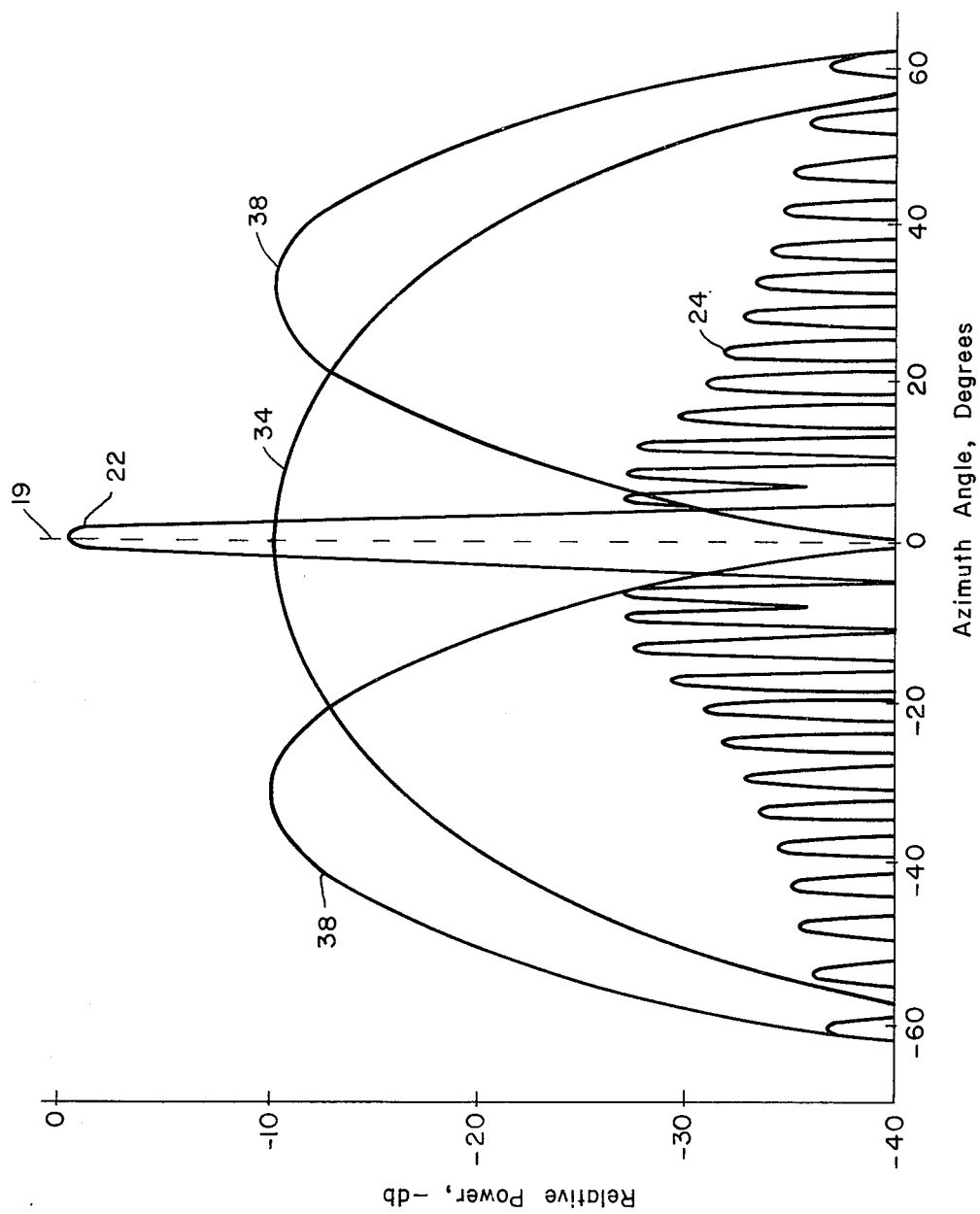
FIG. 2 is a schematic plan view showing the gain characteristics of a main lobe antenna and an auxiliary antenna in accordance with the invention.

Referring now also to FIG. 2, the side-lobes 24 of the main radar antenna 18 have an amplitude substantially lower than the main lobe 22 and the gain between that of the auxiliary antenna 20 and the side-lobe gain of the main antenna 18 may be, for example, selected to be approximately 6 db at the peaks away from the null of the auxiliary antenna. The auxiliary antenna pattern 38 has an odd symmetry with a phase reversal on opposite sides of the axis 19. Thus, energy from the interfering source 14 has a gain in the auxiliary antenna greater than the side-lobe gain in the main antenna 18 except in the direction of the null axis 19. Energy received from the interfering or jamming source 14 in the auxiliary channel is utilized to cancel the jamming energy received in the main channel in the side-lobe positions. Clutter signals are attenuated near the null by the difference pattern 38 in the auxiliary channel and clutter is decorrelated in the difference channel by being received by randomly opposite sides of the axis 19. Also, energy received from the target along the axis 19 is substantially attenuated by the auxiliary antenna 20 as a result of its null. The conventional auxiliary antenna pattern is shown at 34.

Figure 3:
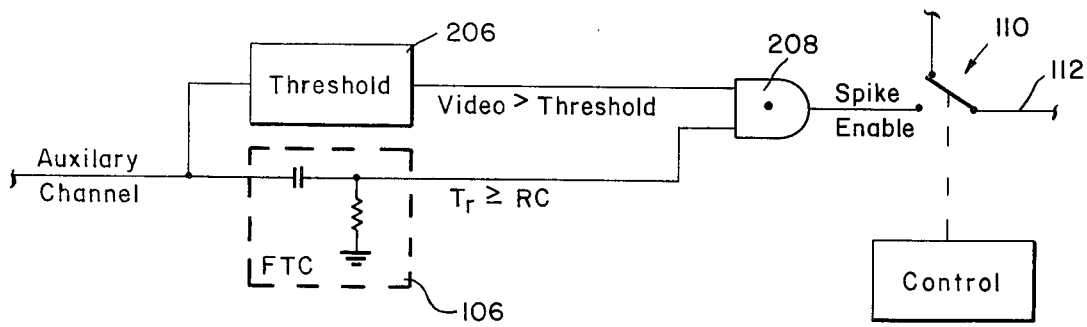
FIG. 3 shows a block diagram of the spike enable circuit of the invention including an illustration of a fast time constant circuit.

Referring to FIGS. 2 and 3 together, FIG. 2 shows the side-lobe suppression antenna coverage in azimuth while FIG. 3 shows a block diagram of the invention. Due to the very large notch in the side-lobe suppression beam in the main beam direction it can be assumed that targets received on the side-lobe suppression channel above a selected threshold could not have originated in the main beam direction. Consequently, the time coincidence of a threshold crossing in the threshold circuit 206 (FIG. 3) and a large signal from the fast time constant (FTC) circuit 106 indicate the presence of an interfering pulse originating from a direction other than in the radar main beam direction. The FTC circuit 106 is set for a 2 or 3 range bin RC time constant so that only pulses with sharp leading edges will produce a suitable output signal from the circuit. The spike enable signal is then sent to the side-lobe blanking circuit via the lead 112 at the discretion of the operator. In a very large spiky clutter environment some false alarms may be generated. The OFF-ON switch 110 allows the operator to select performance in either mode for optimum system performance. High level clutter returns on the auxiliary channel may cause occasional false blanking operation in the spike enable circuit, consequently, the spike enable circuit should only be turned on by the operator when a heavy pulse interference environment is encountered.

Figure 4A:
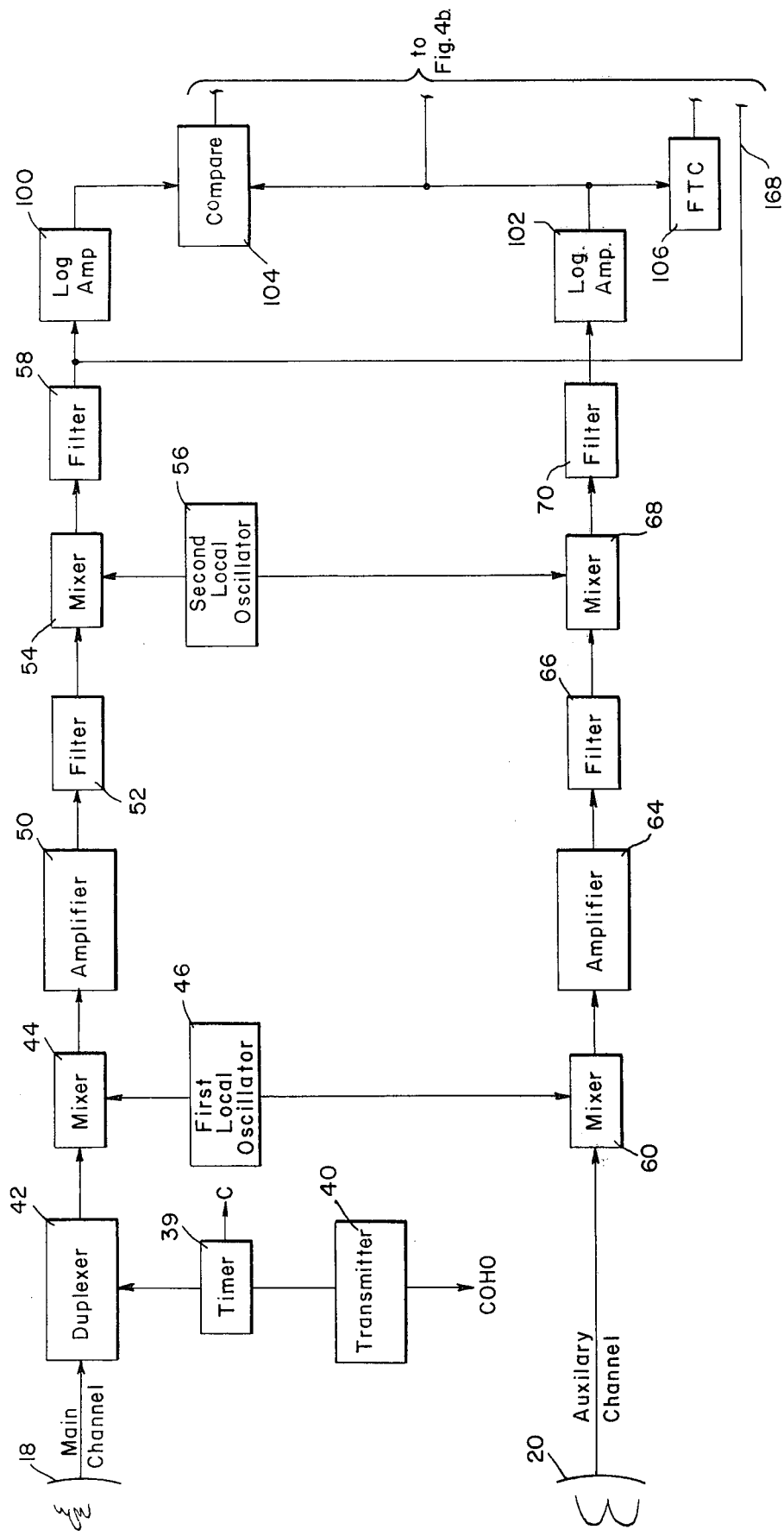
FIGS. 4a and 4b show a block diagram of a radar system into which the spike enable circuit of the invention has been incorporated.
Figure 4B:
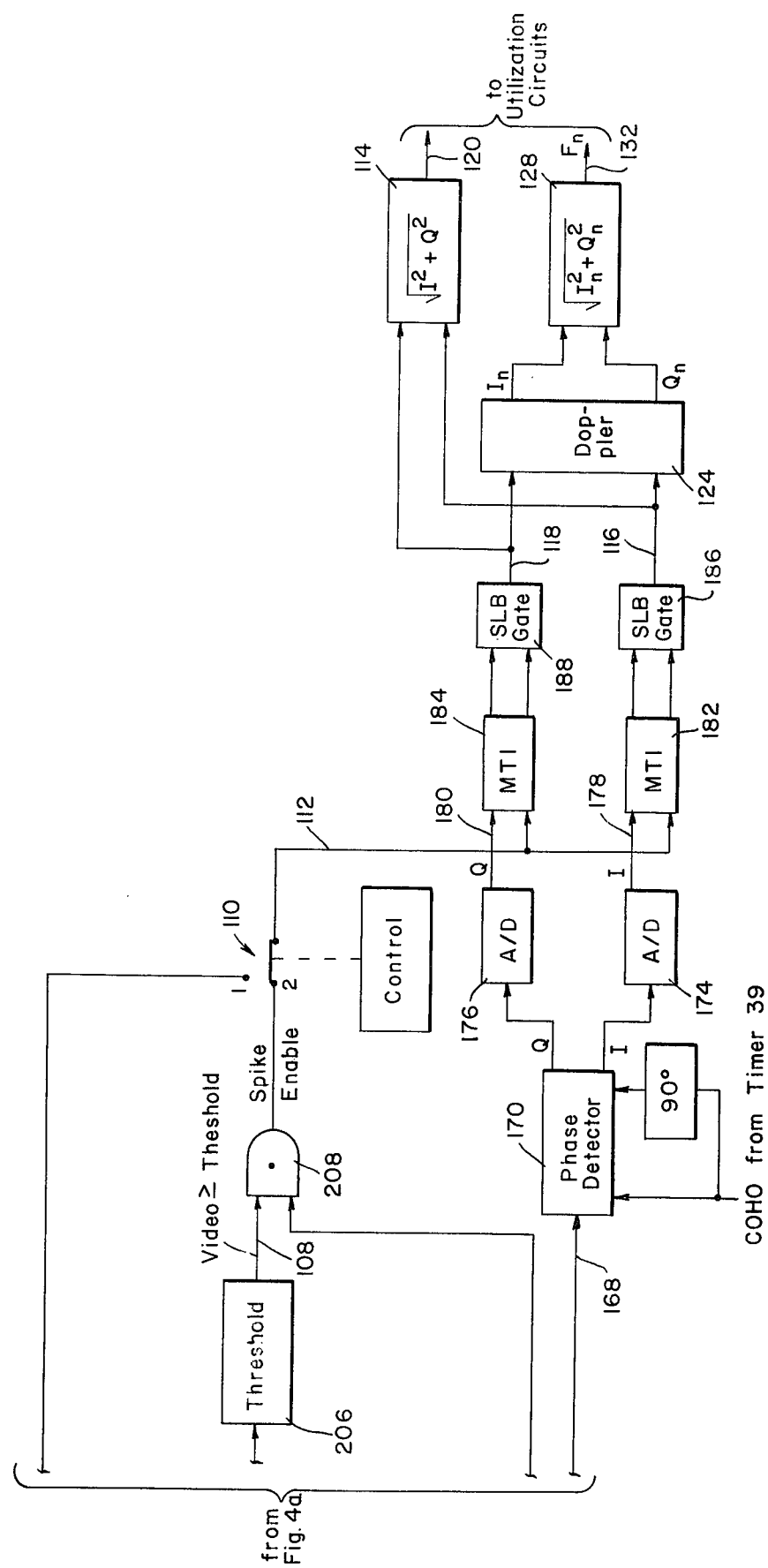

Referring now also to the block diagram of FIGS. 4a and 4b which shows a radar system utilizing side-lobe blanking and the spike enable circuit of the invention, a transmitter 40 may be provided to supply energy pulses through a suitable duplexer 42 and a main lobe antenna 18 to be radiated into space. The energy reflected from a target or object in space is then intercepted by the antenna 18 and passed through the duplexer 42 to a conventional mixer 44 responsive to a first local oscillator 46 for applying a radar intermediate frequency (IF) signal to an IF amplifier 50. AT the same time, energy may be received from an interfering source such as 14 (FIG. 1) by the antenna 20 and applied to a mixer 60 to provide a side-lobe IF signal to an IF amplifier 64. The interfering source 14 may be any operating radar system providing interference energy, a side-lobe repeater as is well-known in the art, or any pulsed interference generator responsive to the received pulse repetition frequency (PRF), for example. As is well-known in the art, side-lobe blanking (SLB) is used primarily to blank interfering or jamming pulses which are of such a short timed duration that other types of cancelling arrangements are unable to acquire these pulses. The purpose of the spike enable circuit of this invention is to allow blanking of pulse interference that arrives via the main antenna side-lobes that is smaller on the side-lobe suppression channel than the clutter signal appearing on the main radar channel.

The main antenna 18 also receives the interfering signals and the auxiliary antenna 20 receives the target reflection signals, however, the selected gains allow the signals to be distinguished as explained relative to FIG. 1. A timer 39 controls the timing of the transmission of pulses of energy and may provide clock pulses (c) to define the range bins during each pulse repetition interval. The radar IF signal, after amplification in IF amplifier 50, is then applied to a filter 52 and thence to a second mixer 54 controlled by second local oscillator 56. This second radar IF signal is then applied to a filter 58 and thence to a suitable amplifier such as a logarithmic amplifier 100 as illustrated. The output of the filter 58 is also applied through a phase detector circuit 170 which generates in-phase (I) and quadrature (Q) components which, in turn, are applied to respective analog-to-digital (A/D) units 174 and 176. The phase detector circuit 170 is also responsive to a coherent reference signal from the timer 39. The digital signals from the A/D units 174 and 176 are respectively applied to moving target indicator units 182 and 184. Most modern search radars include means to detect moving targets in the presence of clutter. In some applications, clutter on the main channel is reduced by the MTI process thus allowing the radar system to extract the moving target echo from the clutter echo even when the clutter echo is considerably greater than the moving target echo. The target signal outputs of the MTI units 182 and 184 along with a gate control signal, are applied to respective side-lobe blanking gates 186 and 188. The outputs of side-lobe blanking gates 186 and 188 are applied as conventionally to a Doppler processor 124 and to utilization circuits as indicated.

In the auxiliary channel the output of IF amplifier 64 is applied to a suitable filter 66 and thence to a second mixer 68 under the control of the second local oscillator 56. This second IF signal is then processed by a suitable filter 70. A comparison circuit 104 responds to the logarithmic signals provided by log amplifiers 100 and 102. Conventionally, a side-lobe blanking gate signal will be generated as the output signal from comparison circuit 104 whenever the logarithmic signal in the auxiliary channel is larger than the logarithmic signal in the main channel. Conventional operation may thus be realized with switch 110 in position 1 whereby a blanking gate signal is applied to a lead 112 and thence to MTI units 182 and 184 to provide blanking control for both the in-phase and the quadrature components.

For conversion of the in-phase and quadrature signals passed through the gates 186 and 188, combiner circuit 114 coupled to leads 116 and 118 may be utilized to generate the $\sqrt{I^2 + Q^2}$ as is well-known in the art to develop the combined radar signal on a lead 120, which is applied to utilization circuits such as a processor or display. As is well-known in the art, the component combiner 114 may use an approximation $(I + KQ)$ when $I$ is greater than or equal to $Q$ and $(KI + Q)$ when $Q$ is greater than or equal to $I$. In a system utilizing a doppler processor 124, the in-phase and quadrature components on the leads 116 and 118 are applied through separate doppler filter banks to ring specific filters and apply signals $I_n$ and $Q_n$ to a signal combiner unit 128. Either a circuit for providing the $\sqrt{I_n^2 + Q_n^2}$ or the above discussed approximation may be utilized in the component combiner 128 to generate a filter number $F_n$ on an output lead 132 which is also applied to suitable utilization circuits.

Consider now, for example, an electromagnetic radiation environment in which the clutter appearing on the main channel is say +40 db signal-to-noise ratio, the interfering signal on the auxiliary channel is +30 db signal-to-noise ratio and the interfering pulse on the main channel is +20 db signal-to-noise ratio. A conventional side-lobe suppression blanking system will not blank this pulse since the output at the main channel log amplifier will represent a processed signal of approximately 40 db to be compared with the interfering signal on the auxiliary channel of +30 db, thus no blanking gate signal will be developed. Subsequent reduction of the clutter on the main channel by the MTI process will allow the +20 db pulse on the main channel to cause a false alarm.

Referring again to FIG. 2, the side-lobe suppression (SLS) antenna's coverage in azimuth is shown. Due to the very large notch in the SLS beam in the main lobe direction, it can be assumed that targets received on the SLS channel above a threshold, say +20 db for instance, could not have originated in the main beam direction. Consequently, the time coincidence of a threshold crossing in the compare circuit which results in a true signal on the lead 108 and a large signal from the FTC circuit, which has been set for a two or three range bin RC time constant so that only pulses with sharp loading edges will energize the circuit, indicates the presence of an interfering pulse originating from a direction other than in the radar main beam direction. The advantages of the invention may be realized with the switch 110 in position 2. An interfering pulse such as just described will cause a threshold crossing in threshold circuit 206, thus causing a true output on the lead 108. If now the leading edge of the interfering pulse is sharp, an output signal will be realized from FTC circuit 106 causing the output from AND gate 208 to become true. This resultant output from AND gate 208 is then applied to the lead 112 as the blanking gate signal for the purpose of blanking an interference pulse as just described. The two position switch 110 allows the operator to compare performance in either mode so as to optimize system performance. Thus, there has been described a pulse interference blanking system to be employed with communications systems such as data transmission or radar systems. The system of the invention is capable of reducing the effect of sharp pulse interference encountered in a high clutter environment while at the same time maintaining a relatively low false target rate. The operator or other means of control may select the mode of operation which appears to be optimum under the circumstances of the particular environment encountered.

What is claimed is:

1. A pulse interference blanking system for operation in high-clutter environments for communications systems equipped with main and auxiliary channels and side-lobe blanking means having amplitude comparison means for comparing the amplitudes of the main and auxiliary channel signals and gating means for generating a blanking signal for blanking said main channel comprising:

spike enable means responsive to interference pulses with sharp leading edges in said auxiliary channel for generating a blanking signal; and switch means responsive to said comparison means and said spike enable means for selectively applying one of said blanking signals to said gating means.

2. The pulse interference blanking system of claim 1 in which said spike enable means includes threshold level circuit means responsive to said interference pulses and provides a threhold level output signal whenever said threshold level is exceeded by an incident incoming signal;

fast time constant circuit means responsive to said interference pulses providing a fast time constant circuit output signal;

logic means responsive to said threshold circuit means and to said fast time constant circuit means and providing an output signal upon coincidence of said threshold level output signal and said fast time constant circuit output signal.

3. The pulse interference blanking system of claim 2 wherein said communications system is a radar system comprising:
- a first receiver channel responsive to a signal received via a main antenna having a predetermined main lobe pattern along a reception axis; and
- a second receiver channel responsive to a signal received via an auxiliary antenna having a pattern of odd symmetry relative to said main lobe pattern of said main antenna.

4. The system of claim 3 wherein said fast time constant circuit means is a resistance-capacitance network.

5. The system of claim 4 wherein the RC time constant of said resistance-capacitance network is of the order of the time constant of the resolution cells of said radar system.

6. The system of claim 2 wherein said logic means is the logical AND function.

7. A radar receiver system comprising:
- a first receiver channel responsive to signals received via a main antenna having a predetermined main lobe pattern along a reception axis;
- a second receiver channel responsive to signals received via an auxiliary antenna having a pattern of odd symmetry relative to said main lobe pattern of said main antenna;
- a compare circuit responsive to simultaneous output signals from said first receiver channel and said second receiver channel;
- threshold level circuit means responsive to video output signals from said second receiver channel to produce an output signal whenever said video output signal exceeds said threshold level;
- fast time constant circuit means responsive to video output signals from said second receiver channel;
- logic means responsive to output signals from said threshold level circuit means and said fast time constant circuit means to produce an output signal upon coincidence of said output signals;
- switch means having a first position responsive to output signals from said compare circuit and providing for side-lobe blanking operation and a second position responsive to output signals from said logic means.

8. The radar receiver system of claim 7 wherein the odd symmetry of said auxiliary antenna has a notch and a phase reversal in the direction of the main lobe of said antenna pattern along the reception axis.

9. The radar receiver system of claim 7 wherein the time constant of said fast time constant means is of the order of the time constants of the resolution cells of said radar receiver system.

10. An improved radar receiver system having a first receiver channel responsive to signals received via a main antenna exhibiting a predetermined main lobe pattern along a reception axis, and having a second receiver channel responsive to signals received via an auxiliary antenna, and a compare circuit responsive to simultaneous output signals from said first receiver channel and said second receiver channel to develop a side-lobe blanking signal whenever the output signal received from said second receiver channel is greater than the output signal received from said first receiver channel, wherein the improvement comprises:
- threshold level circuit means responsive to video output signals from said second receiver channel to produce an output signal whenever said video output signal exceeds said threshold level;
- fast time constant circuit means responsive to video output signals from said second receiver channel for producing output signals whenever said video output signal contains interference pulses having rise times of such duration as to result in wavefront steepnesses exceeding a predetermined value;
- logic means responsive to output signals from said threshold level circuit means and said fast time constant circuit means to produce an output signal upon coincidence of said output signals; and
- switch means having a first position responsive to output signals from said compare circuit and providing for a side-lobe blanking operation and a second position responsive to output signals from said logic means.

11. The improved radar receiver system of claim 10 wherein said auxiliary antenna has a pattern of odd symmetry.

12. The system of claim 11 wherein the odd symmetry of said auxiliary antenna has a notch and a phase reversal in the direction of the main lobe of said main antenna pattern along the reception axis.

13. The system of claim 10 wherein said fast time constant circuit means is a resistance-capacitance network.

14. The system of claim 13 wherein the RC time constant of said resistance-capacitance network is of the order of the time constant of the resolution cells of said radar receiver system.

15. The system of claim 10 wherein said logic means is the logical AND function.

16. The system of claim 10 wherein the output signal from said logic means is a blanking gate signal.

\* \* \* \* \*